(12) United States Patent
Ishida et al.

(10) Patent No.: US 11,018,366 B2
(45) Date of Patent: May 25, 2021

(54) METHOD OF PRODUCING FRAME EQUIPPED MEMBRANE ELECTRODE ASSEMBLY, THE FRAME EQUIPPED MEMBRANE ELECTRODE AND FUEL CELL

(71) Applicant: HONDA MOTOR CO., LTD., Tokyo (JP)

(72) Inventors: Kentaro Ishida, Wako (JP); Matthew Beutel, Webster, NY (US); Yutaka Ebato, Wako (JP); Masami Kurimoto, Wako (JP); Kohei Yoshida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 338 days.

(21) Appl. No.: 16/252,072

(22) Filed: Jan. 18, 2019

(65) Prior Publication Data

US 2020/0235416 A1    Jul. 23, 2020

(51) Int. Cl.

| | |
|---|---|
| *H01M 8/242* | (2016.01) |
| *H01M 8/2457* | (2016.01) |
| *H01M 8/0273* | (2016.01) |
| *H01M 8/0267* | (2016.01) |
| *H01M 8/2483* | (2016.01) |

(52) U.S. Cl.
CPC ......... *H01M 8/242* (2013.01); *H01M 8/0267* (2013.01); *H01M 8/0273* (2013.01); *H01M 8/2457* (2016.02); *H01M 8/2483* (2016.02)

(58) Field of Classification Search
None
See application file for complete search history.

(56) References Cited

U.S. PATENT DOCUMENTS

| | | |
|---|---|---|
| 8,399,150 B2 | 3/2013 | Miller et al. |
| 9,911,988 B2 | 3/2018 | Beutel et al. |
| 10,381,661 B2 | 8/2019 | Ohmori et al. |

(Continued)

FOREIGN PATENT DOCUMENTS

| | | |
|---|---|---|
| DE | 102016212912 A1 | 1/2017 |
| JP | 2013-515348 A | 5/2013 |
| JP | 2017-045637 A | 3/2017 |
| JP | 2017-079170 A | 4/2017 |
| WO | 2012/137609 A1 | 10/2012 |

OTHER PUBLICATIONS

Office Action and Search Report, both dated Nov. 22, 2019, issued over the corresponding German Patent Application No. 10 2019 202 686.9 of co-pending U.S. Appl. No. 15/910,810, with the English translations thereof.

(Continued)

*Primary Examiner* — Wyatt P McConnell
(74) *Attorney, Agent, or Firm* — Carrier Blackman & Associates, P.C.; Joseph P. Carrier; William D. Blackman

(57) ABSTRACT

A frame equipped membrane electrode assembly or a frame equipped MEA of a fuel cell includes a membrane electrode assembly or an MEA and a frame member provided on an outer peripheral portion of the MEA. A method of producing the frame equipped MEA includes a first joining step of joining a first resin frame film and a second resin frame film together in a thickness direction to form a film joint body, a welding step of spot welding a first resin sheet to a portion of the first resin frame film facing a second inlet buffer when the fuel cell is formed, to form the frame member, and a second joining step of joining the frame member to the outer peripheral portion of the MEA.

11 Claims, 8 Drawing Sheets

(56) References Cited

U.S. PATENT DOCUMENTS

| | | |
|---|---|---|
| 2005/0142397 A1 | 6/2005 | Wakahoi et al. |
| 2009/0208805 A1 | 8/2009 | Wakabayashi et al. |
| 2011/0136038 A1* | 6/2011 | Ishida ................. H01M 8/0276 |
| | | 429/480 |
| 2011/0151350 A1 | 6/2011 | Iverson et al. |
| 2014/0017590 A1 | 1/2014 | Sugishita et al. |
| 2015/0099208 A1 | 4/2015 | Sugiura et al. |
| 2016/0260993 A1 | 9/2016 | Ikeda |
| 2016/0285119 A1 | 9/2016 | Hayashi |
| 2017/0018785 A1* | 1/2017 | Ohmori ................. H01M 8/242 |

OTHER PUBLICATIONS

Office Action issued in co-pending U.S. Appl. No. 15/910,810 dated Aug. 21, 2019.
Office Action issued in co-pending U.S. Appl. No. 15/910,752 dated Jul. 10, 2020.
Office Action dated Dec. 22, 2020 issued over a corresponding Japanese Patent Application No. 2019-037510, to co-pending U.S. Appl. No. 15/910,752 and the English translation thereof.
Office Action dated Jan. 7, 2021 issued in co-pending U.S. Appl. No. 15/910,752.
U.S. Appl. No. 15/910,752, filed Mar. 2, 2018.
U.S. Appl. No. 15/910,810, filed Mar. 2, 2018.
U.S. Appl. No. 16/526,531, filed Jul. 30, 2019.
U.S. Appl. No. 16/526,565, filed Jul. 30, 2019.

* cited by examiner

METHOD OF PRODUCING FRAME EQUIPPED MEMBRANE ELECTRODE ASSEMBLY, THE FRAME EQUIPPED MEMBRANE ELECTRODE AND FUEL CELL

BACKGROUND OF THE INVENTION

Field of the Invention

The present invention relates to a method of producing a frame equipped membrane electrode assembly. Further, the present invention relates to the frame equipped membrane electrode assembly, and a fuel cell.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly. The membrane electrode assembly is formed by providing an anode on one surface of the solid polymer electrolyte membrane, and providing a cathode on the other surface of the solid polymer electrolyte membrane.

The membrane electrode assembly is sandwiched between separators (bipolar plates) to form a fuel cell. In use, a predetermined number of fuel cells are stacked together to form, e.g., an in-vehicle fuel cell stack mounted in a vehicle.

For example, according to the disclosure of U.S. Pat. No. 8,399,150, a frame equipped membrane electrode assembly includes a single resin frame film provided on an outer peripheral portion of the membrane electrode assembly. A reinforcement resin sheet is adhered to a surface of the resin frame film on a side where a cathode is provided.

SUMMARY OF THE INVENTION

The separator is provided with a buffer connecting a reactant gas flow field for allowing a reactant gas to flow along an electrode surface, and a passage for allowing the reactant gas to flow in a direction perpendicular to the electrode surface. In the case of using a resin frame film as a frame member, since a portion of the frame member facing the buffer of the separator is deformed easily by the differential pressure between the cathode and the anode, it is required to increase rigidity.

Further, when the entire surface of the resin sheet is adhered to the resin frame film using an adhesive, the quantity of the used adhesive becomes large, and the number of processes is increased. Therefore, the cost of producing the frame equipped membrane electrode assembly is increased.

The present invention has been made taking such problems, and an object of the present invention is to provide a method of producing a frame equipped membrane electrode assembly which makes it possible to increase the rigidity of a portion of a frame member facing a buffer of a separator, and achieve reduction of the production cost, and provide the frame equipped membrane electrode assembly and a fuel cell.

According to a first aspect of the present invention, a method of producing a frame equipped membrane electrode assembly is provided. The frame equipped membrane electrode assembly includes a membrane electrode assembly including an electrolyte membrane and electrodes provided on both sides of the electrolyte membrane, and a frame member provided on an outer peripheral portion of the membrane electrode assembly, the frame equipped membrane electrode assembly being sandwiched between a pair of separators to form a fuel cell, the pair of separators each including a buffer configured to connect a reactant gas flow field and a fluid passage together, the reactant gas flow field being configured to allow a reactant gas to flow along an electrode surface, the fluid passage being configured to allow the reactant gas to flow in a direction perpendicular to the electrode surface. The method includes a first joining step of joining a first resin frame film and a second resin frame film together in a thickness direction to form a film joint body, a welding step of spot welding a resin sheet to a portion of the first resin frame film facing the buffer when the fuel cell is formed, after the first joining step, to form the frame member including the first resin frame film, the second resin frame film, and the resin sheet, and a second joining step of joining the frame member to the outer peripheral portion of the membrane electrode assembly.

According to a second aspect of the present invention, a frame equipped membrane electrode assembly is provided. The frame equipped membrane electrode assembly includes a membrane electrode assembly including an electrolyte membrane and a first electrode provided on one surface of the electrolyte membrane and a second electrode provided on another surface of the electrolyte membrane, and a frame member provided on an outer peripheral portion of the membrane electrode assembly over an entire periphery, the frame equipped membrane electrode assembly being sandwiched between a pair of separators to form a fuel cell, the pair of separators each including a buffer configured to connect a reactant gas flow field and a fluid passage together, the reactant gas flow field being configured to allow a reactant gas to flow along an electrode surface, the fluid passage being configured to allow the reactant gas to flow in a direction perpendicular to the electrode surface. The frame member includes a first resin frame film and a second resin frame film joined together in a thickness direction, and a resin sheet including a spot-shape joint part in a portion of the first resin frame film facing the buffer when the fuel cell is formed.

According to a third aspect of the present invention, a fuel cell is provided. The fuel cell includes a pair of separators each including a buffer configured to connect a reactant gas flow field and a fluid passage together, the reactant gas flow field being configured to allow a reactant gas to flow along an electrode surface, the fluid passage being configured to allow the reactant gas to flow in a direction perpendicular to the electrode surface, and a frame equipped membrane electrode assembly being sandwiched between the pair of separators. The frame equipped membrane electrode assembly includes a membrane electrode assembly including an electrolyte membrane and a first electrode provided on one surface of the electrolyte membrane and a second electrode provided on another surface of the electrolyte membrane, and a frame member provided on an outer peripheral portion of the membrane electrode assembly over an entire periphery. The frame member includes a first resin frame film and a second resin frame film joined together in a thickness direction, and a resin sheet including a spot-shape joint part in a portion of the second resin frame film facing the buffer when the fuel cell is formed.

In the present invention, the resin sheet is spot welded (joined at a spot or a plurality of spots) to the portion of the first resin frame film facing the buffer of the separator. In the structure, it is possible to increase the rigidity of the portion of the frame member facing the buffer of the separator.

Further, in comparison with the case where the entire surface of the resin sheet is adhered to the first resin frame film using an adhesive, it is possible to reduce the cost of adhesive and the number of processes required for the adhering step. Accordingly, it is possible to achieve reduction of the production cost.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a method of producing a frame equipped membrane electrode assembly, the frame equipped membrane electrode assembly, and a fuel cell will be described with reference to the accompanying drawings.

Figure 1:
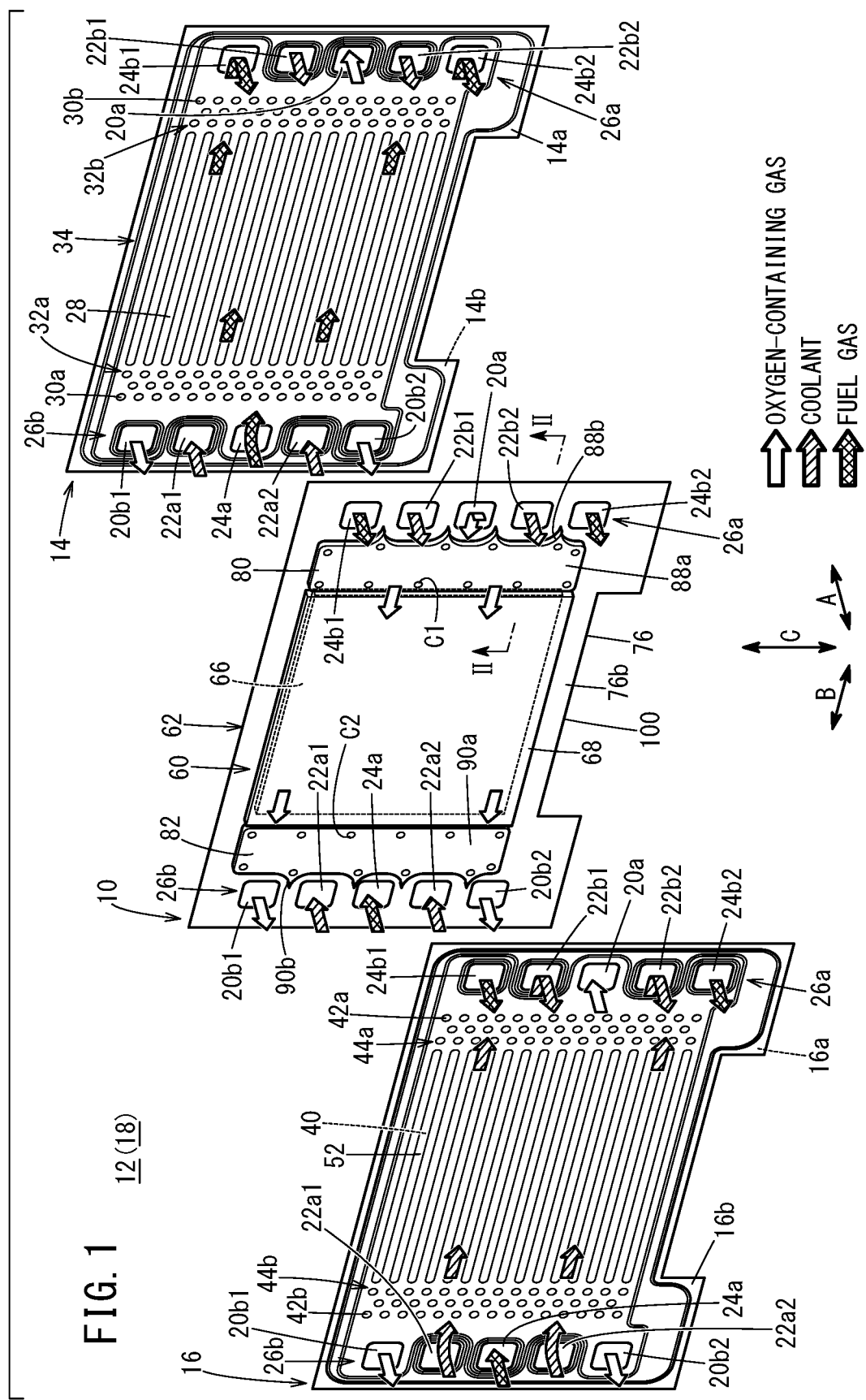
FIG. 1 is an exploded perspective view showing main components of a fuel cell according to an embodiment of the present invention.
Figure 2:
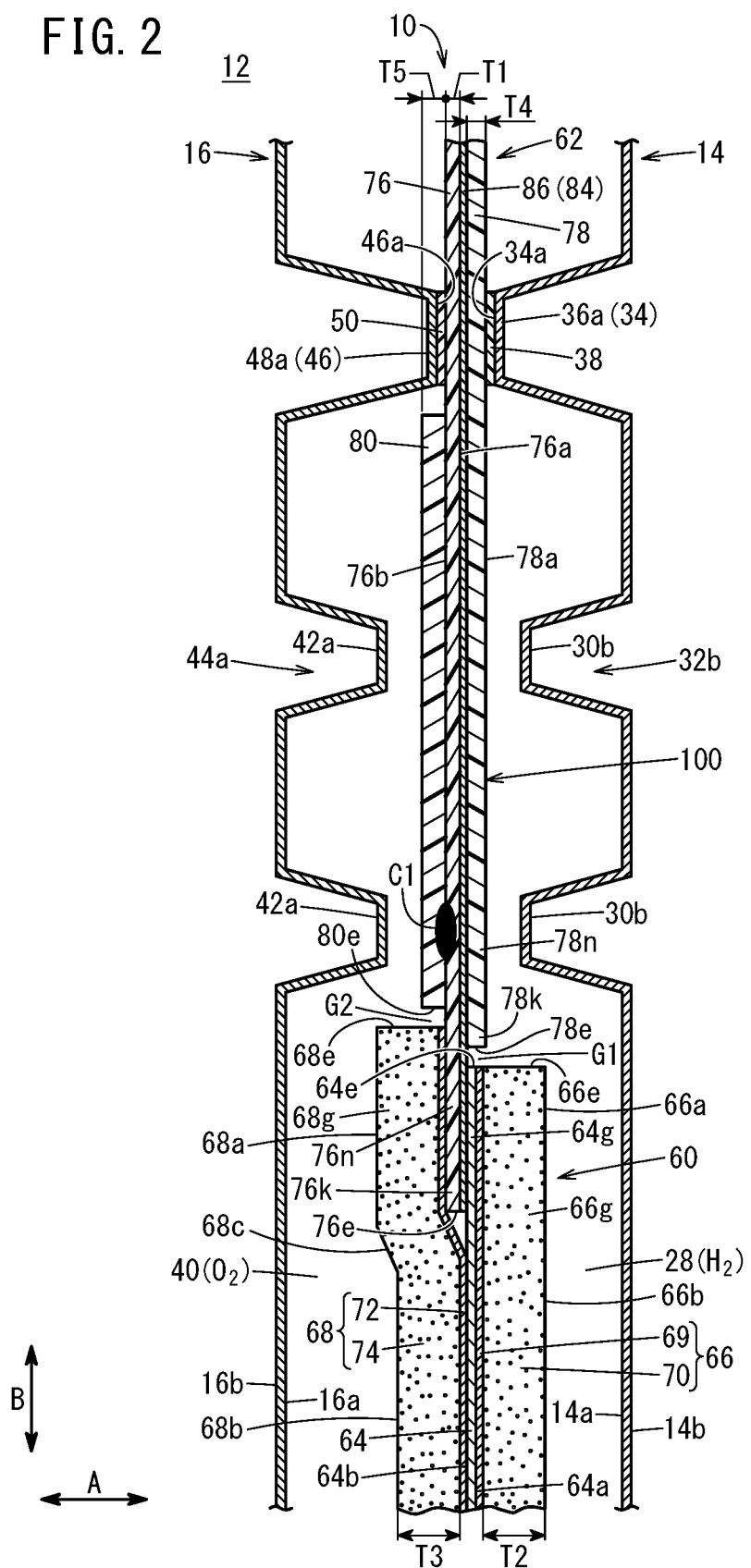
FIG. 2 is a cross sectional view showing a fuel cell taken along a line II-II in FIG. 1.

As shown in FIGS. 1 and 2, a fuel cell 12 according to one embodiment of the present invention includes a first separator 14, a second separator 16, and a frame equipped membrane electrode assembly 10 (hereinafter referred to as the "frame equipped MEA 10").

The fuel cell 12 is a power generation cell capable of performing power generation by electrochemical reactions of a fuel gas and an oxygen-containing gas. In FIG. 1, for example, the fuel cell 12 is a solid polymer electrolyte fuel cell having a laterally elongated (or longitudinally elongated) rectangular shape. For example, a plurality of the fuel cells 12 are stacked together in a direction indicated by an arrow A (horizontal direction) or in a direction indicated by an arrow C (gravity direction) to form a fuel cell stack 18. A tightening load (compression load) in the stacking direction (indicated by the arrow A) is applied to the fuel cell stack 18.

For example, the fuel cell stack 18 is mounted in a fuel cell vehicle such as a fuel cell electric automobile (not shown). It should be noted that the fuel cell stack 18 may be used in stationary applications.

In the fuel cell 12, the frame equipped MEA 10 is sandwiched between the first separator 14 and the second separator 16. Each of the first separator 14 and the second separator 16 has a laterally elongated (or longitudinally elongated) rectangular shape. Each of the first separator 14 and the second separator 16 is a steel plate, a stainless steel plate, an aluminum plate, a plated steel plate, or a metal plate having an anti-corrosive surface by surface treatment, or a carbon member, etc.

As shown in FIG. 1, at one end of the fuel cell 12 in the direction indicated by the arrow B (horizontal direction), one oxygen-containing gas supply passage 20a, two coolant discharge passages 22b1, 22b2, and two fuel gas discharge passages 24b1, 24b2 are provided. The fuel gas discharge passage 24b1, the coolant discharge passage 22b1, the oxygen-containing gas supply passage 20a, the coolant discharge passage 22b2, and the fuel gas discharge passage 24b2 are arranged in this order in the direction indicated by the arrow C.

An oxygen-containing gas is supplied through the oxygen-containing gas supply passage 20a. A coolant such as pure water, ethylene glycol, oil is discharged through the coolant discharge passages 22b1, 22b2. A fuel gas such as a hydrogen-containing gas is discharged through the fuel gas discharge passages 24b1, 24b2.

Hereinafter, fluid passages provided at one end of the fuel cell 12 (the oxygen-containing gas supply passage 20a, the coolant discharge passages 22b1, 22b2, and the fuel gas discharge passages 24b1, 24b2) will also be referred to as "first fluid passages 26a". The first fluid passages 26a extend through the first separator 14, a frame member 62 as part of the frame equipped MEA 10, and the second separator 16 in the stacking direction.

The oxygen-containing gas supply passage 20a extends through each of the fuel cells 12 in the stacking direction (indicated by the arrow A). The coolant discharge passage 22b1 extends through each of the fuel cells 12 in the stacking direction. The coolant discharge passage 22b2 extends through each of the fuel cells 12 in the stacking direction. The fuel gas discharge passage 24b1 extends through each of the fuel cells 12 in the stacking direction. The fuel gas discharge passage 24b2 extends through each of the fuel cells 12 in the stacking direction.

At the other end of the fuel cell 12 in the direction indicated by the arrow B, one fuel gas supply passage 24a, two coolant supply passages 22a1, 22a2, and two oxygen-containing gas discharge passages 20b1, 20b2 are provided. The oxygen-containing gas discharge passage 20b1, the coolant supply passage 22a1, the fuel gas supply passage 24a, the coolant supply passage 22a2, and the oxygen-containing gas discharge passage 20b2 are arranged in this order in the direction indicated by the arrow C.

The fuel gas such as a hydrogen-containing gas is supplied through the fuel gas supply passage 24a. The coolant such as pure water, ethylene glycol, oil is supplied through the coolant supply passages 22a1, 22a2. The oxygen-containing gas is discharged through the oxygen-containing gas discharge passages 20b1, 20b2.

Hereinafter, fluid passages provided at the other end of the fuel cell 12 (the fuel gas supply passage 24a, the coolant supply passages 22a1, 22a2, and the oxygen-containing gas discharge passages 20b1, 20b2) will also be referred to as "second fluid passages 26b". The second fluid passages 26b extend through the first separator 14, the frame member 62 as part of the frame equipped MEA 10, and the second separator 16 in the stacking direction.

The fuel gas supply passage 24a extends through each of the fuel cells 12 in the stacking direction (indicated by the arrow A). The coolant supply passage 22a1 extends through each of the fuel cells 12 in the stacking direction. The coolant supply passage 22a2 extends through each of the fuel cells 12 in the stacking direction. The oxygen-containing gas discharge passage 20b1 extends through each of the fuel cells 12 in the stacking direction. The oxygen-containing gas discharge passage 20$b2$ extends through each of the fuel cells 12 in the stacking direction.

Figure 3:
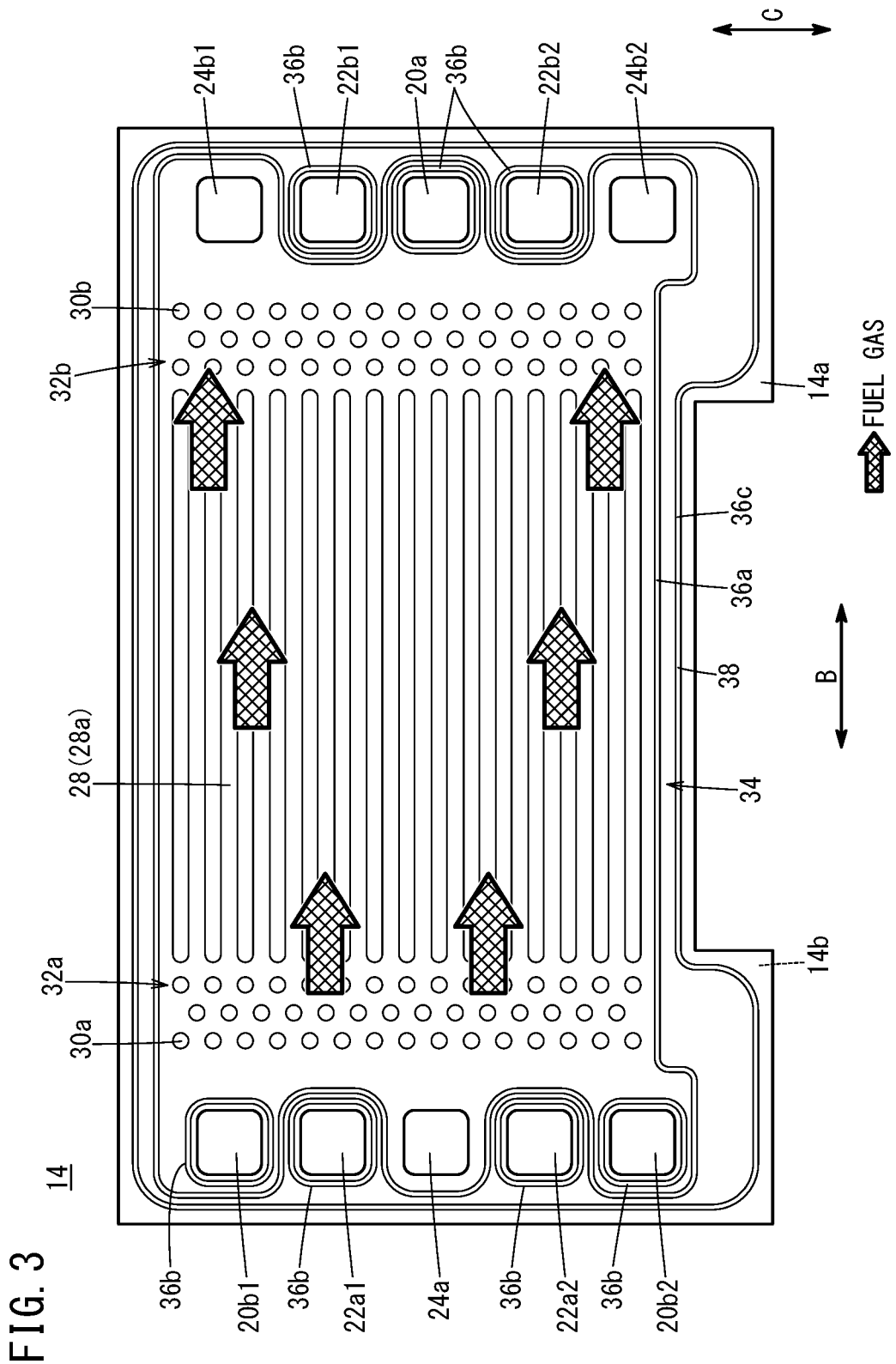
FIG. 3 is a plan view showing a first separator.

As shown in FIG. 3, the first separator 14 has a fuel gas flow field 28 on its surface 14$a$ facing the frame equipped MEA 10 (hereinafter referred to as the "surface 14$a$"). The fuel gas flow field 28 is connected to the fuel gas supply passage 24$a$ and the fuel gas discharge passages 24$b1$, 24$b2$. Specifically, the fuel gas flow field 28 is formed between the first separator 14 and the frame equipped MEA 10 (see FIG. 2). The fuel gas flow field 28 includes a plurality of straight flow grooves 28$a$ extending in the direction indicated by the arrow B. Instead of the above structure, the fuel gas flow field 28 may include wavy flow grooves extending in the direction indicated by the arrow B.

A first inlet buffer 32$a$ is provided on the surface 14$a$ of the first separator 14, between the fuel gas supply passage 24$a$ and the fuel gas flow field 28. The first inlet buffer 32$a$ includes a plurality of bosses 30$a$ arranged in the direction indicated by the arrow C.

A first outlet buffer 32$b$ is provided on the surface 14$a$ of the first separator 14, between the fuel gas discharge passages 24$b1$, 24$b2$ and the fuel gas flow field 28. The first outlet buffer 32$b$ includes a plurality of bosses 30$b$ arranged in the direction indicated by the arrow C. Each of the bosses 30$a$, 30$b$ has a circular shape as viewed in the stacking direction (indicated by the arrow A) of the fuel cells 12. Each of the bosses 30$a$, 30$b$ may have an oval shape or a linear shape extending in the direction indicated by the arrow B, as viewed in the stacking direction. The bosses 30$a$, 30$b$ protrude toward the frame member 62 of the frame equipped MEA 10.

A first bead seal 34 is provided on the surface 14$a$ of the first separator 14, for preventing leakage of fluid (fuel gas, oxygen-containing gas, and coolant) to the outside. The first bead seal 34 includes a first inner bead 36$a$ and a plurality of first passage beads 36$b$, and a first outer bead 36$c$. Each of the first inner bead 36$a$, the plurality of first passage beads 36$b$, and the first outer bead 36$c$ is formed by press forming, and expanded toward the frame member 62 of the frame equipped MEA 10 (see FIG. 2).

The first inner bead 36$a$ is formed around the fuel gas flow field 28, the fuel gas supply passage 24$a$, the fuel gas discharge passages 24$b1$, 24$b2$, the oxygen-containing gas supply passage 20$a$, and the oxygen-containing gas discharge passages 20$b1$, 20$b2$. The first inner bead 36$a$ allows the fuel gas flow field 28 to be connected to the fuel gas supply passage 24$a$, and the fuel gas discharge passages 24$b1$, 24$b2$. The plurality of first passage beads 36$b$ are provided around the coolant supply passages 22$a1$, 22$a2$, the coolant discharge passages 22$b1$, 22$b2$, the oxygen-containing gas supply passage 20$a$, and the oxygen-containing gas discharge passages 20$b1$, 20$b2$, respectively. The first outer bead 36$c$ is formed around the first separator 14, along the outer periphery of the first separator 14.

In FIG. 2, first resin material 38 (or rubber material) is fixed to a protruding front end surface 34$a$ of the first bead seal 34 by printing, coating, etc. The first bead seal 34 contacts the frame member 62 of the frame equipped MEA 10 in an air tight and liquid tight manner through the first resin material 38. The first resin material 38 may be adhered to the frame member 62. Instead of using the first bead seal 34, the first separator 14 may be provided with a ridge seal of elastic material protruding toward the frame member 62 of the frame equipped MEA 10.

Figure 4:
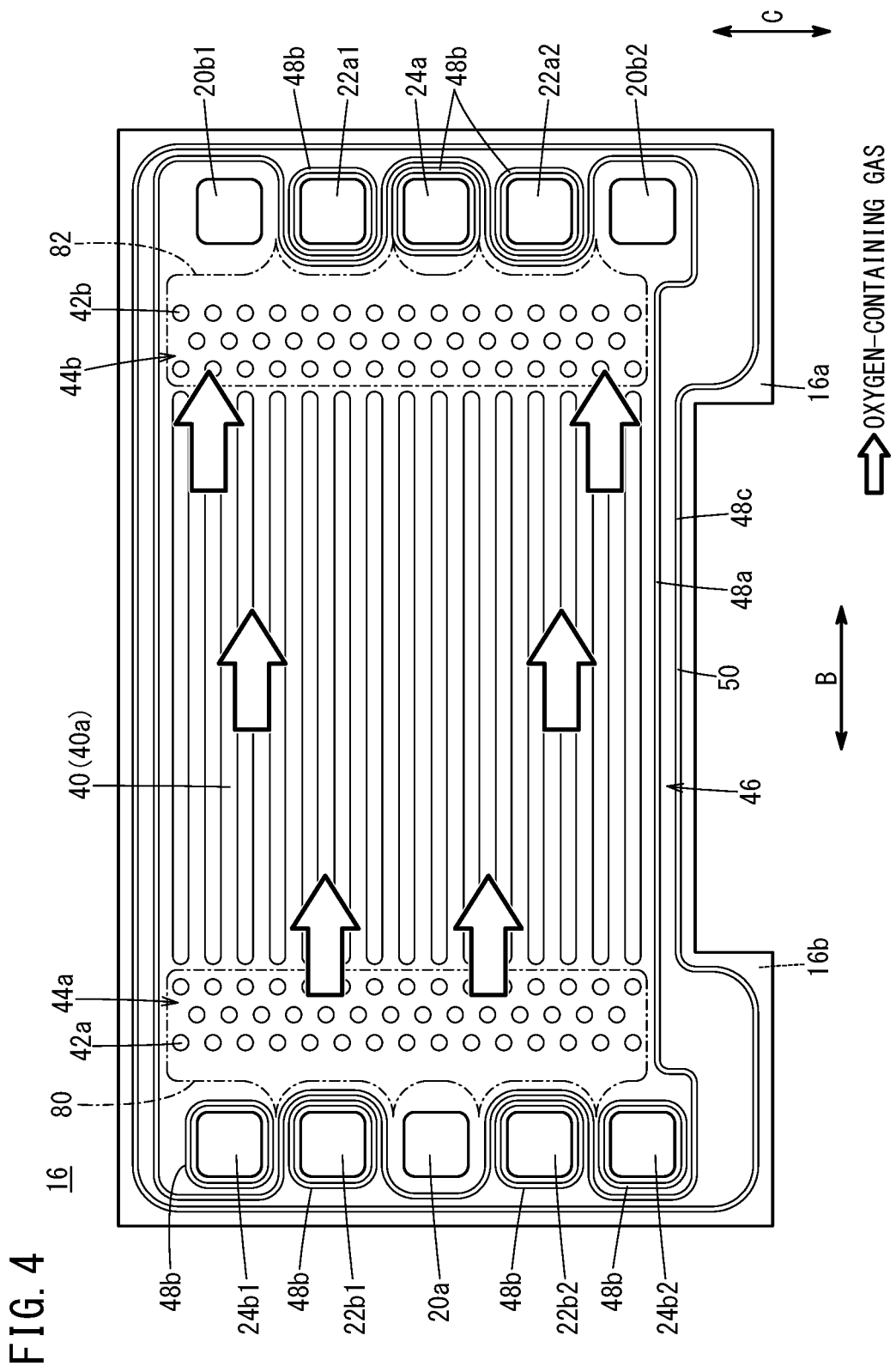
FIG. 4 is a plan view showing a second separator.

As shown in FIG. 4, the second separator 16 has an oxygen-containing gas flow field 40 on its surface 16$a$ facing the frame equipped MEA 10 (hereinafter referred to as the "surface 16$a$"). The oxygen-containing gas flow field 40 is connected to the oxygen-containing gas supply passage 20$a$ and the oxygen-containing gas discharge passages 20$b1$, 20$b2$. Specifically, the oxygen-containing gas flow field 40 is formed between the second separator 16 and the frame equipped MEA 10 (see FIG. 2). The oxygen-containing gas flow field 40 includes a plurality of straight flow grooves 40$a$ extending in the direction indicated by the arrow B. Instead of adopting the above structure, the oxygen-containing gas flow field 40 may include wavy flow grooves extending in the direction indicated by the arrow B.

A second inlet buffer 44$a$ is provided on the surface 16$a$ of the second separator 16, between the oxygen-containing gas supply passage 20$a$ and the oxygen-containing gas flow field 40. The second inlet buffer 44$a$ includes a plurality of bosses 42$a$ arranged in the direction indicated by the arrow C. A second outlet buffer 44$b$ is provided on the surface 16$a$ of the second separator 16, between the oxygen-containing gas discharge passages 20$b1$, 20$b2$ and the oxygen-containing gas flow field 40. The second outlet buffer 44$b$ includes a plurality of bosses 42$b$ arranged in the direction indicated by the arrow C. Each of the bosses 42$a$, 42$b$ has a circular shape as viewed in the stacking direction. Each of the bosses 42$a$, 42$b$ may have an oval shape or a linear shape extending in the direction indicated by the arrow B, as viewed in the stacking direction. The bosses 42$a$, 42$b$ protrude toward the frame member 62 of the frame equipped MEA 10.

A second bead seal 46 is provided on the surface 16$a$ of the second separator 16, for preventing leakage of fluid (fuel gas, oxygen-containing gas, and coolant) to the outside. The second bead seal 46 is formed by press forming. The second bead seal 46 is expanded toward the frame member 62 of the frame equipped MEA 10 (see FIG. 2). The second bead seal 46 includes a second inner bead 48$a$, a plurality of second passage beads 48$b$, and a second outer bead 48$c$.

The second inner bead 48$a$ is formed around the oxygen-containing gas flow field 40, the oxygen-containing gas supply passage 20$a$, the oxygen-containing gas discharge passages 20$b1$, 20$b2$, the fuel gas supply passages 24$a$, and the fuel gas discharge passages 24$b1$, 24$b2$. The second inner bead 48$a$ allows the oxygen-containing gas flow field 40 to be connected to the oxygen-containing gas supply passage 20$a$ and the oxygen-containing gas discharge passages 20$b1$, 20$b2$. The second passage beads 48$b$ are provided around the coolant supply passages 22$a1$, 22$a2$, the coolant discharge passages 22$b1$, 22$b2$, the fuel gas supply passage 24$a$, and the fuel gas discharge passages 24$b1$, 24$b2$, respectively. The second outer bead 48$c$ is formed around the second separator 16, along the outer periphery of the second separator 16.

In FIG. 2, second resin material 50 (or rubber material) is fixed to a protruding front end surface 46$a$ of the second bead seal 46 by printing, coating, etc. The second bead seal 46 contacts the frame member 62 of the frame equipped MEA 10 in an air tight and liquid tight manner through the second resin material 50. The second resin material 50 may be adhered to the frame member 62. Instead of using the second bead seal 46, the second separator 16 may be provided with a ridge seal of elastic material protruding toward the frame member 62 of the frame equipped MEA 10.

For example, polyester fiber, silicone, EPDM, FKM, etc. is used as each of the first resin material 38 and the second resin material 50. The first resin material 38 and the second resin material 50 may be dispensed with. In this case, the first bead seal 34 and the second bead seal 46 directly contact the frame member 62 of the frame equipped MEA 10. The first bead seal 34 and the second bead seal 46 face each other through the frame member 62 of the frame equipped MEA 10.

As shown in FIG. 1, a coolant flow field 52 extending in the direction indicated by the arrow B is formed between a surface 14b of the first separator 14 and a surface 16b of the second separator 16 that are adjacent to each other. The coolant flow field 52 is connected to the coolant supply passages 22a1, 22a2 and the coolant discharge passages 22b1, 22b2. The coolant flow field 52 is formed between the back surface of the fuel gas flow field 28 and the back surface of the oxygen-containing gas flow field 40.

Figure 5:
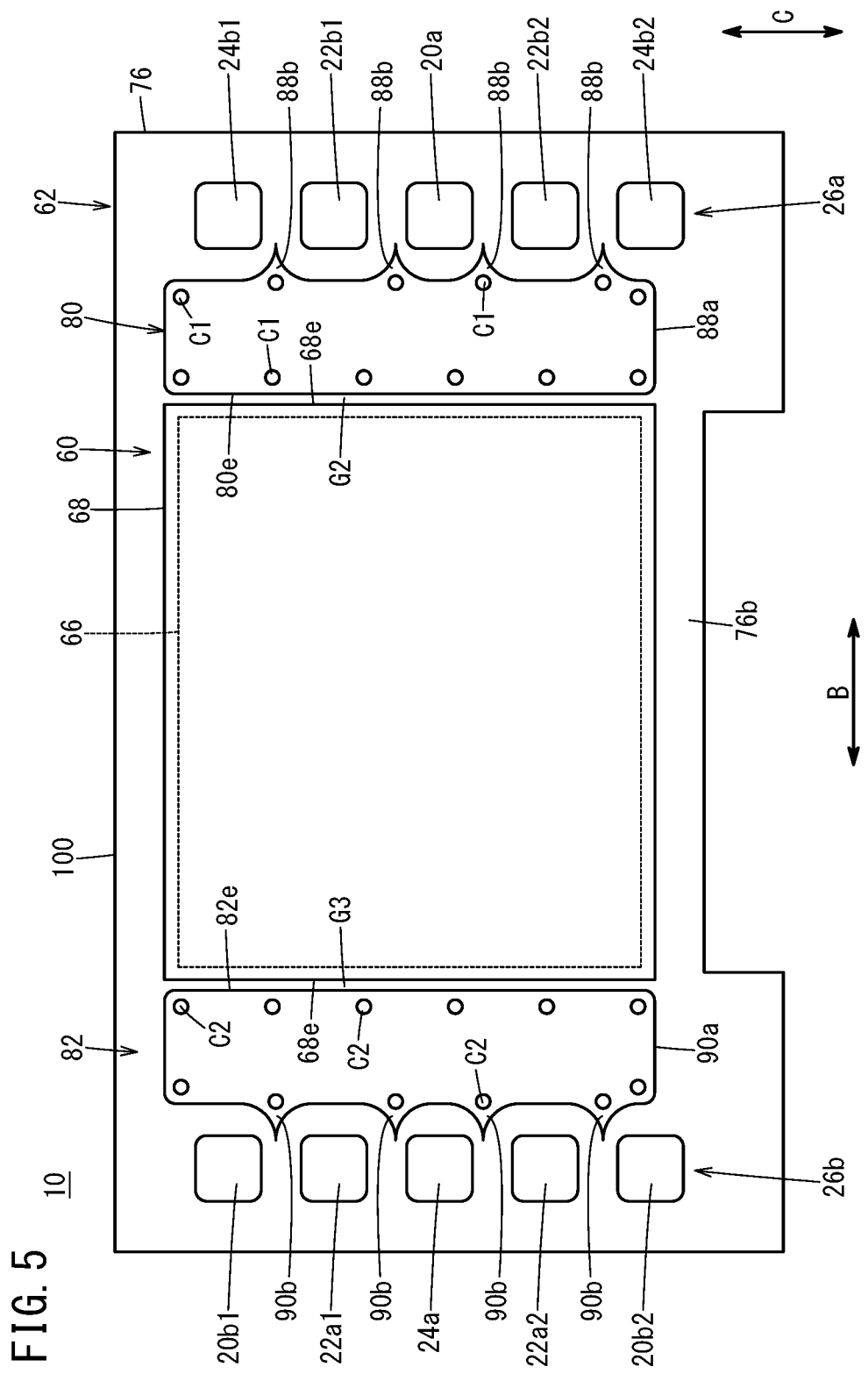
FIG. 5 is a plan view showing a frame equipped membrane electrode assembly in FIG. 1.

As shown in FIGS. 1, 2, and 5, the frame equipped MEA 10 includes a membrane electrode assembly 60 (hereinafter referred to as the "MEA 60"), and a frame member 62 provided on an outer peripheral portion of the MEA 60. In FIG. 2, the MEA 60 includes an electrolyte membrane 64, a first electrode 66 as an anode provided on one surface 64a of the electrolyte membrane 64, and a second electrode 68 as a cathode provided on another surface 64b of the electrolyte membrane 64.

For example, the electrolyte membrane 64 is a solid polymer electrolyte membrane (cation ion exchange membrane). For example, the solid polymer electrolyte membrane is a thin membrane of perfluorosulfonic acid containing water. The electrolyte membrane 64 is interposed between the first electrode 66 and the second electrode 68. A fluorine based electrolyte may be used as the electrolyte membrane 64. Alternatively, an HC (hydrocarbon) based electrolyte may be used as the electrolyte membrane 64.

The electrolyte membrane 64 and the first electrode 66 have the same surface size (outer size). That is, an outer end 66e of the first electrode 66 is aligned with an outer end 64e of the electrolyte membrane 64 over the entire periphery. The surface size of the first electrode 66 is smaller than the surface size of the second electrode 68. That is, the outer end 66e of the first electrode 66 and the outer end 64e of the electrolyte membrane 64 are positioned inside an outer end 68e of the second electrode 68 over the entire periphery.

As shown in FIG. 2, the first electrode 66 includes a first electrode catalyst layer 69 joined to the one surface 64a of the electrolyte membrane 64, and a first gas diffusion layer 70 stacked on the first electrode catalyst layer 69. The first electrode catalyst layer 69 and the first gas diffusion layer 70 have the same surface size which is the same as the surface size of the electrolyte membrane 64.

The surface size of the second electrode 68 is larger than the surface size of the electrolyte membrane 64 and the first electrode 66. Therefore, the outer end 68e of the second electrode 68 is positioned outside the outer end 64e of the electrolyte membrane 64 and the outer end 66e of the first electrode 66.

The second electrode 68 includes a second electrode catalyst layer 72 joined to the other surface 64b of the electrolyte membrane 64, and a second gas diffusion layer 74 stacked on the second electrode catalyst layer 72. The second electrode catalyst layer 72 and the second gas diffusion layer 74 have the same surface size which is larger than the surface size of the electrolyte membrane 64 and the first electrode 66.

For example, the first electrode catalyst layer 69 is formed by porous carbon particles deposited uniformly on the surface of the first gas diffusion layer 70 together with an ion conductive polymer binder and platinum alloy supported on the porous carbon particles. For example, the second electrode catalyst layer 72 is formed by porous carbon particles deposited uniformly on the surface of the second gas diffusion layer 74 together with an ion conductive polymer binder and platinum alloy supported on the porous carbon particles. The first gas diffusion layer 70 and the second gas diffusion layer 74 are made of carbon paper or carbon cloth, etc.

As shown in FIGS. 2 and 5, the frame member 62 includes a first resin frame film 76, a second resin frame film 78, a first resin sheet 80, and a second resin sheet 82.

Each of the first resin frame film 76, the second resin frame film 78, the first resin sheet 80, and the second resin sheet 82 is made of, e.g., PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

Each of the first resin frame film 76 and the second resin frame film 78 has a rectangular annular shape (rectangular frame shape) (see FIGS. 1 and 5). In FIG. 2, the first resin frame film 76 and the second resin frame film 78 are joined together in the thickness direction (indicated by the arrow A). Specifically, the first resin frame film 76 and the second resin frame film 78 are adhered together by an adhesive layer 86 made of an adhesive 84. The first resin frame film 76 and the second resin frame film 78 have the same surface size (outer size).

The adhesive layer 86 is provided over one entire surface 76a of the first resin frame film 76. As the adhesive 84 of the adhesive layer 86, for example, a liquid adhesive or a hot melt sheet is provided. It should be noted that the adhesive 84 is not limited to a liquid or solid adhesive, and not limited to a thermoplastic or thermosetting adhesive, etc. The first resin frame film 76 and the second resin frame film 78 are adhered together in the thickness direction by the adhesive layer 86 to form a film joint body 100.

The outer peripheral portion of the frame member 62 of the frame equipped MEA 10 (area where the first resin frame film 76 and the second resin frame film 78 are overlapped with each other) is held between the first bead seal 34 and the second bead seal 46. In this regard, since the first resin frame film 76 and the second resin frame film 78 are joined together in the thickness direction, in comparison with the case where the frame member 62 is in the form of a single thin resin film, it is possible to produce the frame member 62 to have relatively large thickness. Thus, it is possible to bring the first resin material 38 and the second resin material 50 into contact with the outer peripheral portion of the frame member 62 by elastically deforming the first bead seal 34 and the second bead seal 46. Thus, it is possible to obtain desired seal surface pressure, and achieve good sealing performance. Accordingly, it is possible to effectively prevent leakage of fluid (fuel gas, oxygen-containing gas, coolant) from the fuel cells 12.

A thickness T1 of the first resin frame film 76 is smaller than a thickness T2 of the first electrode 66 (thickness of the first gas diffusion layer 70) and a thickness T3 of the second electrode 68 (thickness of the second gas diffusion layer 74). The thickness T2 of the first electrode 66 and the thickness T3 of the second electrode 68 are the same. It should be noted that the thickness T2 of the first electrode 66 and the thickness T3 of the second electrode 68 may be different from each other.

An inner peripheral portion 76n of the first resin frame film 76 is joined to the outer peripheral portion of the MEA 60. Stated otherwise, the inner peripheral portion 76n of the first resin frame film 76 is held between an outer peripheral portion 66g of the first electrode 66 and an outer peripheral portion 68g of the second electrode 68 over the entire periphery. Specifically, the inner peripheral portion 76n of the first resin frame film 76 and an outer peripheral portion 64g of the electrolyte membrane 64 are joined together through the adhesive layer 86.

The inner peripheral portion 76n of the first resin frame film 76 includes an overlap part 76k overlapped with the outer peripheral portion 66g of the first electrode 66 over the entire periphery, as viewed in the stacking direction. That is, an inner end 76e of the first resin frame film 76 is positioned inside the outer end 66e of the first electrode 66 and the outer end 68e of the second electrode 68. It should be noted that, in the state where the adhesive layer 86 is joined to the electrolyte membrane 64, the inner peripheral portion 76n of the first resin frame film 76 may be held between the electrolyte membrane 64 and the first electrode 66.

The above described second electrode 68 has a step at a position corresponding to the inner end 76e of the first resin frame film 76. Specifically, the second electrode 68 has an inclined area 68c inclined from the electrolyte membrane 64, between an area 68a overlapped with the inner periphery of the first resin frame film 76 and an area 68b overlapped with the electrolyte membrane 64.

The first electrode 66 has a flat shape from an area 66a overlapped with the inner peripheral portion 76n of the first resin frame film 76 to an area 66b overlapped with the electrolyte membrane 64. Instead of adopting the above structure, the first electrode 66 may include an inclined area inclined from the electrolyte membrane 64 between an area 66a overlapped with the inner peripheral portion 76n of the first resin frame film 76 and the area 66b overlapped with the electrolyte membrane 64 (area inclined in a direction opposite to the inclined area 68c).

In contrast with the above structure, the second electrode 68 may have a flat shape from the area 68a overlapped with the inner peripheral portion 76n of the first resin frame film 76 to the area 68b overlapped with the electrolyte membrane 64, and the first electrode 66 may include an inclined area inclined from the electrolyte membrane 64, between the area 66a overlapped with the inner peripheral portion 76n of the first resin frame file 76 and the area 66b overlapped with the electrolyte membrane 64.

The first resin frame film 76 and the second resin frame film 78 are joined together in a manner that the second resin frame film 78 positioned outside the inner peripheral portion 76n of the first resin frame film 76. A thickness T4 of the second resin frame film 78 is larger than the thickness T1 of the first resin frame film 76. The thickness T4 of the second resin frame film 78 is smaller than the thickness T2 of the first electrode 66 and the thickness T3 of the second electrode 68. The thickness T2 of the second resin frame film 78 and the thickness T1 of the first resin frame film 76 may be the same.

An inner end 78e of the second resin frame film 78 is positioned outside the inner end 76e of the first resin frame film 76. Specifically, the inner end 78e of the second resin frame film 78 is provided in a manner that a gap G1 is disposed outside the outer end 66e of the first electrode 66 and the outer end 64e of the electrolyte membrane 64. That is, the gap G1 is formed between the inner end 78e of the second resin frame film 78 and the outer end 66e of the first electrode 66, and the outer end 64e of the electrolyte membrane 64 over the entire periphery. The above adhesive layer 86 is exposed to the gap G1. The gap G1 is overlapped with the outer peripheral portion 68g of the second electrode 68 as viewed in the stacking direction.

The inner end 78e of the second resin frame film 78 is positioned inside the outer end 68e of the second electrode 68 over the entire periphery. An inner peripheral portion 78n of the second resin frame film 78 includes an overlap part 78k overlapped with the outer peripheral portion 68g of the second electrode 68 over the entire periphery as viewed in the stacking direction.

As shown in FIGS. 1 and 5, the first resin sheet 80 and the second resin sheet 82 are joined to another surface 76b of the first resin frame film 76 (surface of the first resin frame film 76 opposite to the second resin frame film 78) such that the second electrode 68 is positioned between the first resin sheet 80 and the second resin sheet 82 in the direction indicated by the arrow B. In FIG. 2, no resin sheet is provided on a surface 78a of the second resin frame film 78 opposite to the first resin frame film 76. A thickness T5 of the first resin sheet 80 is not less than the thickness T4 of the second resin frame film 78. In the embodiment, though the thickness of the second resin sheet 82 is the same as the thickness T5 of the first resin sheet 80, the thickness of the second resin sheet 82 may be different from the thickness T5 of the first resin sheet 80.

As shown in FIGS. 2 and 5, a gap G2 is formed between the first resin sheet 80 and the second electrode 68. An outer end 80e of the first resin sheet 80 closer to the second electrode 68 is positioned outside the inner end 78e of the second resin frame film 78 (see FIG. 2).

The first resin sheet 80 is joined to the first resin frame film 76 facing the second inlet buffer 44a of the second separator 16, at a plurality of positions (spots). In the embodiment of the present invention, the first resin sheet 80 is spot welded to the first resin frame film 76, at a plurality of positions. Alternatively, the first resin sheet 80 may be spot-adhered to the first resin frame film 76 using an adhesive (adhered at a spot or a plurality of spots).

As shown in FIG. 4, the first resin sheet 80 faces the second inlet buffer 44a. The first resin sheet 80 is disposed to cover the second inlet buffer 44a entirely. Alternatively, the first resin sheet 80 may be disposed to cover only part of the second inlet buffer 44a.

In FIG. 5, the first resin sheet 80 includes a first sheet body 88a, and four first extensions 88b extending from the first sheet body 88a toward the outer end of the first resin frame film 76 opposite to the second electrode 68 (one end of the first resin frame film 76 in the direction indicated by the arrow B). The first sheet body 88a has a rectangular shape, and extends in the direction indicated by the arrow C. The first sheet body 88a is positioned between the plurality of first fluid passages 26a (the oxygen-containing gas supply passage 20a, the coolant discharge passages 22b1, 22b2, and the fuel gas discharge passages 24b1, 24b2) and the second electrode 68.

The four first extensions 88b extend from the first sheet body 88a to positions between the adjacent first fluid passages 26a. The first extensions 88b have a substantially triangular shape as viewed in the stacking direction. That is, the first extensions 88b are narrowed in the direction in which the first extensions 88b extend.

As shown in FIG. 5, a plurality of first joint parts C1 (welded parts) for joining the first resin sheet 80 and the first resin frame film 76 together are provided along the outer periphery (outer shape) of the first resin sheet 80. Specifically, the plurality of first joint parts C1 are provided at respective corners of the first sheet body 88a, and at positions along the side of the first sheet body 88a facing the second electrode 68, and positions adjacent to the extended ends of the respective first extensions 88*b*. That is, the first joint part C1 is not provided at the center of the first resin sheet 80.

The size and the shape of the first sheet body 88*a* can be determined freely. The size, the number, and the shape of the first extensions 88*b* can be determined freely. The first extensions 88*b* may be dispensed with as necessary. The first joint part C1 may be provided at the center of the first resin sheet 80.

A gap G3 is formed between the second resin sheet 82 and the second electrode 68. The size of the gap G3 (distance between the second resin sheet 82 and the second electrode 68) is the same as the size of the gap G2 (distance between the first resin sheet 80 and the second electrode 68). It should be noted that the size of the gap G3 and the size of the gap G2 may be different from each other. An outer end 82*e* of the second resin sheet 82 closer to the second electrode 68 is positioned outside the inner end 78*e* (see FIG. 2) of the second resin frame film 78.

The second resin sheet 82 is joined to the first resin frame film 76 facing the second outlet buffer 44*b* of the second separator 16, at a plurality of positions (spots). In the embodiment of the present invention, the second resin sheet 82 is spot welded to the first resin frame film 76 at a plurality of positions. Alternatively, the second resin sheet 82 may be spot-adhered to the first resin frame film 76 using an adhesive (adhered at a spot or a plurality of spots).

As shown in FIG. 4, the second resin sheet 82 faces the second outlet buffer 44*b*. The second resin sheet 82 is provided to cover the second outlet buffer 44*b* entirely. Alternatively, the second resin sheet 82 may be disposed to cover only part of the second outlet buffer 44*b*.

In FIG. 5, the second resin sheet 82 includes a second sheet body 90*a*, and four second extensions 90*b* extending from the second sheet body 90*a* toward the outer end of the first resin frame film 76 opposite to the second electrode 68 (the other end of the first resin frame film 76 in the direction indicated by the arrow B). The second sheet body 90*a* has a rectangular shape, and extends in the direction indicated by the arrow C. The second sheet body 90*a* is positioned between the plurality of second fluid passages 26*b* (the fuel gas supply passage 24*a*, the coolant supply passages 22*a*1, 22*a*2, and the oxygen-containing gas discharge passages 20*b*1, 20*b*2) and the second electrode 68.

The four second extensions 90*b* extend from the second sheet body 90*a* to positions between the adjacent second fluid passages 26*b*. The second extensions 90*b* have a substantially triangular shape as viewed in the stacking direction. That is, the second extensions 90*b* are narrowed in the direction in which the second extensions 90*b* extend.

As shown in FIG. 5, a plurality of second joint parts C2 (welded parts) for joining the second resin sheet 82 and the first resin frame film 76 together are provided along the outer periphery (outer shape) of the second resin sheet 82. Specifically, the plurality of first second parts C2 are provided at respective corners of the second sheet body 90*a*, and at positions along the side of the second sheet body 90*a* facing the second electrode 68, and positions adjacent to the extended ends of the respective second extensions 90*b*. That is, the second joint part C2 is not provided at the center of the second resin sheet 82.

The size and the shape of the second sheet body 90*a* can be determined freely. The size, the number, and the shape of the second extension 90*b* can be determined freely. The second extension 90*b* may be dispensed with as necessary. The second joint part C2 may be provided at the center of the second resin sheet 82.

Operation of the fuel cell 12 having the above structure will be described below.

As shown in FIG. 1, a fuel gas such as a hydrogen-containing gas is supplied to the fuel gas supply passage 24*a*, and an oxygen-containing gas is supplied to the oxygen-containing gas supply passage 20*a*. Further, a coolant such as pure water, ethylene glycol, oil is supplied to the coolant supply passages 22*a*1, 22*a*2.

Therefore, the fuel gas flows from the fuel gas supply passage 24*a* into the fuel gas flow field 28 of the first separator 14. The fuel gas moves along the fuel gas flow field 28 in the direction indicated by the arrow B, and the fuel gas is supplied to the first electrode 66 of the MEA 60. In the meanwhile, the oxygen-containing gas flows from the oxygen-containing gas supply passage 20*a* into the oxygen-containing gas flow field 40 of the second separator 16. The oxygen-containing gas moves in the direction indicated by the arrow B, and the oxygen-containing gas is supplied to the second electrode 68 of the MEA 60.

Therefore, in the MEA 60, the fuel gas supplied to the first electrode 66 and the oxygen-containing gas supplied to the second electrode 68 are partially consumed in electrochemical reactions in the first electrode catalyst layer 69 and the second electrode catalyst layer 72 to generate electricity.

Then, in FIG. 1, the fuel gas supplied to the first electrode 66 is partially consumed at the first electrode 66, and the fuel gas is discharged along the fuel gas discharge passages 24*b*1, 24*b*2 in the direction indicated by the arrow A. Likewise, the oxygen-containing gas supplied to the second electrode 68, and partially consumed at the second electrode 68 is discharged along the oxygen-containing gas discharge passages 20*b*1, 20*b*2 in the direction indicated by the arrow A.

Further, the coolant supplied to the coolant supply passages 22*a*1, 22*a*2 flows into the coolant flow field 52 between the first separator 14 and the second separator 16, and the coolant flows in the direction indicated by the arrow B. After the coolant cools the MEA 60, the coolant is discharged into the coolant discharge passages 22*b*1, 22*b*2.

Next a method of producing the frame equipped MEA 10 will be described below.

Figure 6:
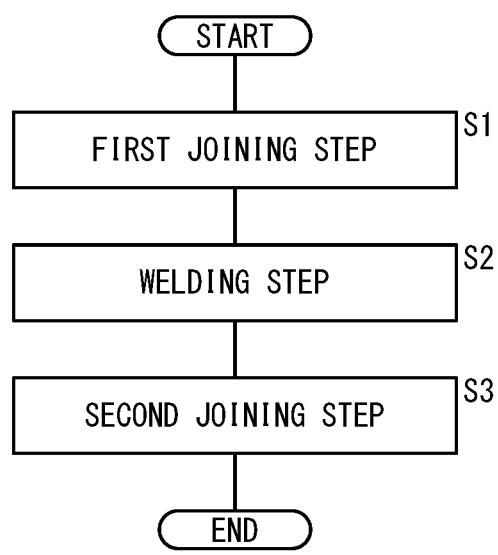
FIG. 6 is a flow chart showing a method of producing the frame equipped membrane electrode assembly in FIG. 1.

As shown in FIG. 6, the method of producing the frame equipped MEA 10 includes a first joining step (step S1), a welding step (step S2), and a second joining step (step S3).

Figure 7A:
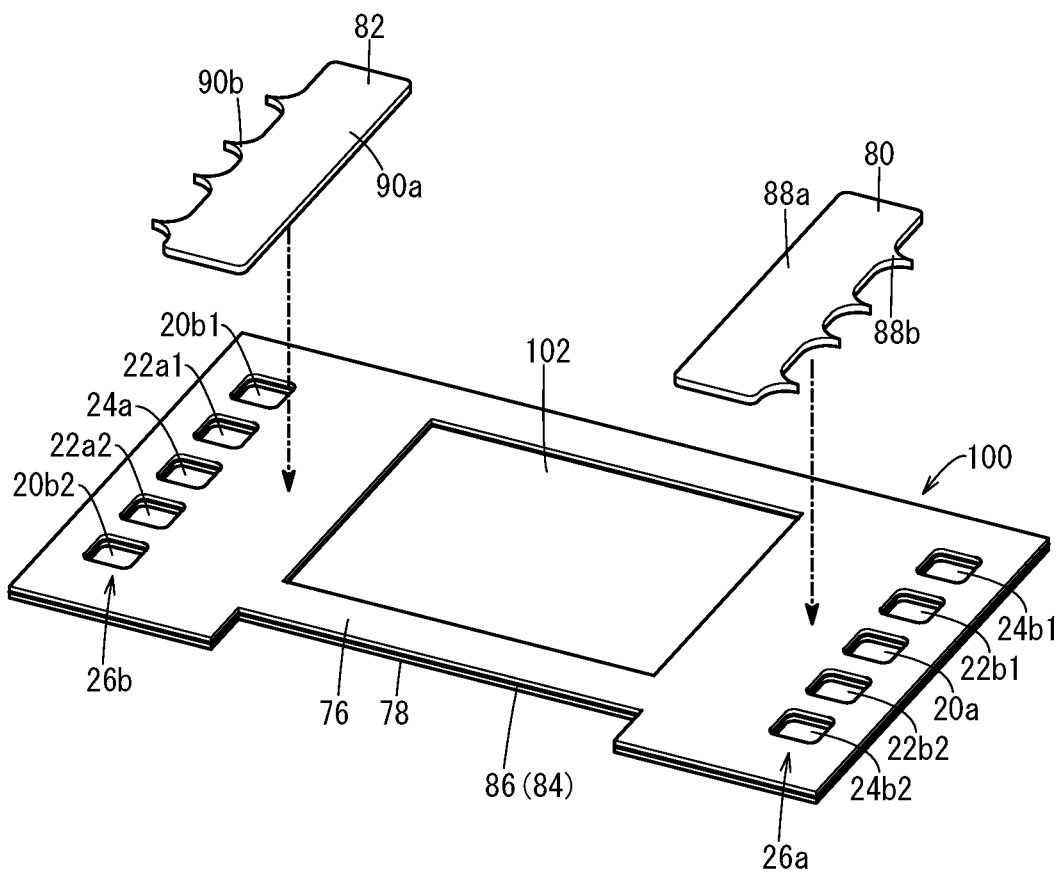
FIG. 7A is a first view showing a welding step.

In step S1 (first joining step) of FIG. 6, as shown in FIG. 7A, the first resin frame film 76 and the second resin frame film 78 are joined together in the thickness direction through the adhesive 84, by hot pressing to form the film joint body 100.

An opening 102 is formed by trimming, at the center of the film joint body 100. The MEA 60 is provided in the opening 102. Further, the fuel gas supply passage 24*a*, the fuel gas discharge passages 24*b*1, 24*b*2, the oxygen-containing gas supply passage 20*a*, the oxygen-containing gas discharge passages 20*b*1, 20*b*2, the coolant supply passages 22*a*1, 22*a*2, and the coolant discharge passages 22*b*1, 22*b*2 are formed by trimming in the film joint body 100.

Figure 7B:
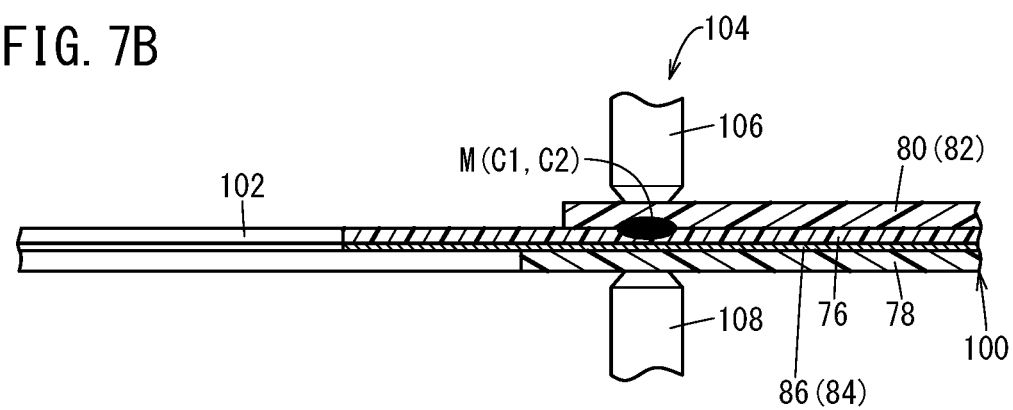
FIG. 7B is a second view showing the welding step.

In step S2 (welding step) of FIG. 6, as shown in FIGS. 7A and 7B, the first resin sheet 80 and the second resin sheet 82 are spot welded to the first resin frame film 76. Specifically, in FIG. 7A, the first resin sheet 80 is disposed at a position between the plurality of first fluid passages 26*a* and the opening 102 of the first resin frame film 76 (portion facing the second inlet buffer 44*a* when the fuel cell 12 is formed).

In this regard, each of the plurality of first extensions 88b of the first resin sheet 80 is positioned between the adjacent first fluid passages 26a.

Then, as shown in FIG. 7B, using a welding apparatus 104 (joining apparatus), the outer peripheral portion of the first resin sheet 80 is spot welded (thermally welded) to the first resin frame film 76 at a plurality of positions. Specifically, a welding target portion of the first resin sheet 80 is held between, and pressurized by a first press member 106 and a second press member 108 of the welding apparatus 104.

That is, in the welding step, the first press member 106 is brought in contact with the welding target portion of the first resin sheet 80, and the second press member 108 is brought into contact with the portion in the surface 78a of the second resin frame film 78 opposite to the first resin frame film 76, corresponding to the welding target portion. At this time, the first press member 106 is heated.

In this manner, the first resin sheet 80 and the first resin frame film 76 are melted by heat transmitted from the first press member 106 at a spot or a plurality of spots. Then, the first press member 106 is moved away from the first resin sheet 80, and a melted portion M between the first resin sheet 80 and the first resin frame film 76 is cooled to form the spot-shape first joint part C1 (welded part). As a result, the first resin sheet 80 is welded to the first resin frame film 76.

Further, in FIG. 7A, the second resin sheet 82 is disposed at a position between the plurality of second fluid passages 26b of the first resin frame film 76 and the opening 102 (portion facing the second outlet buffer 44b when the fuel cell 12 is formed). At this time, each of the plurality of the second extensions 90b of the second resin sheet 82 is positioned between the adjacent second fluid passages 26b.

Then, in FIG. 7B, using the welding apparatus 104, the outer peripheral portion of the second resin sheet 82 is spot welded (thermally welded) to the first resin frame film 76 at a plurality of positions. The welding of the second resin sheet 82 is performed in the same manner as the welding of the first resin sheet 80. In this manner, the frame member 62 is formed.

In the welding step, both of the first press member 106 and the second press member 108 may be heated. Further, in the welding step, for example, welding may be performed by radiating laser light to the welding target portions of the first resin sheet 80 and the second resin sheet 82 to form weld spots. Further, in the welding step, welding may be performed by applying supersonic waves to the welding target portions of the first resin sheet 80 and the second resin sheet 82 using a supersonic welding apparatus (not shown) to form weld spots.

Figure 8A:
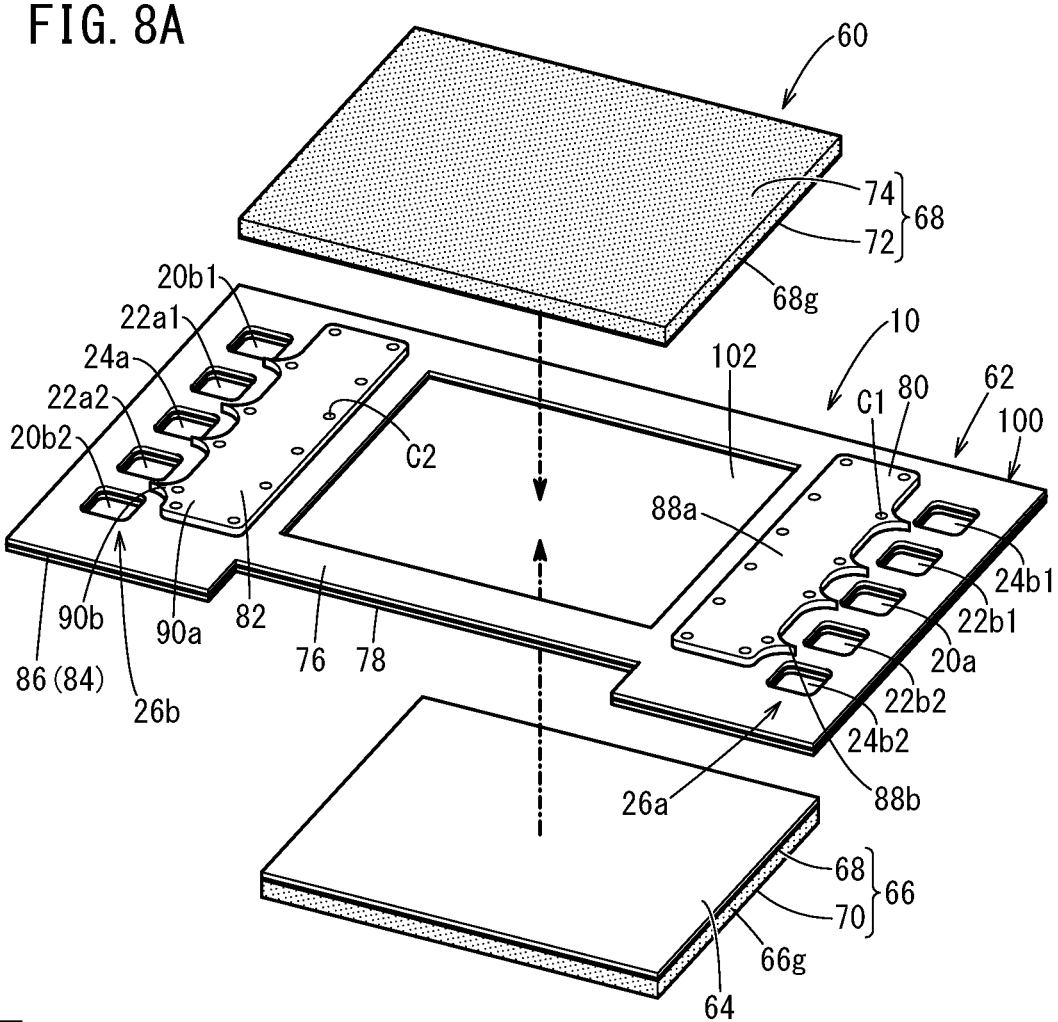
FIG. 8A is a first view showing an MEA joining step.
Figure 8B:
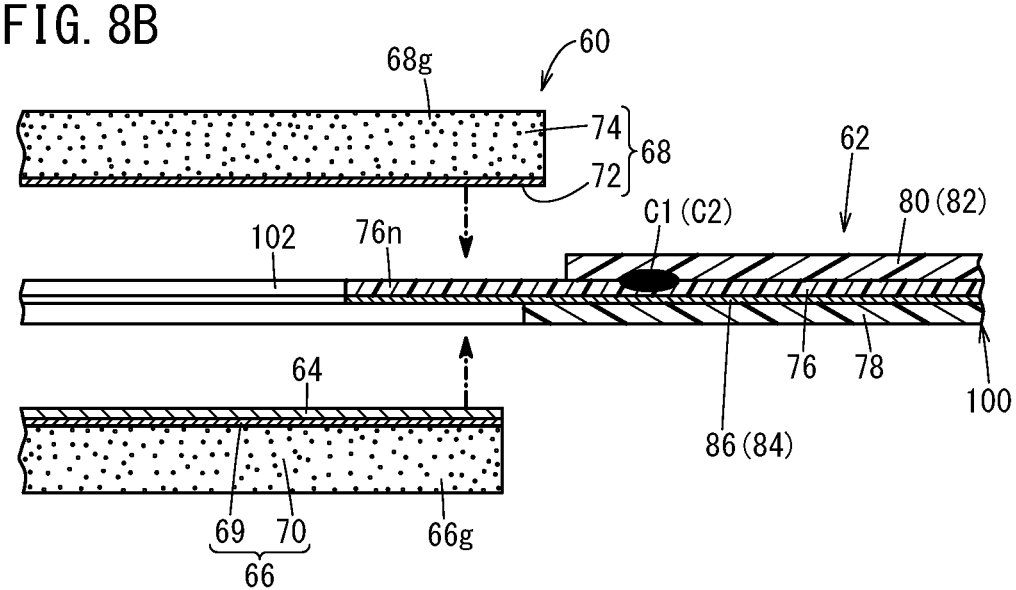
FIG. 8B is a second view showing the MEA joining step.

In step S3 (second joining step) of FIG. 6, as shown in FIGS. 8A and 8B, the frame member 62 is joined to the outer peripheral portion of the MEA 60. Specifically, firstly, the first electrode 66 provided with the electrolyte membrane 64 and the second electrode 68 are prepared.

Then, the inner peripheral portion 76n of the first resin frame film 76 is disposed between the outer peripheral portion 66g of the first electrode 66 and the outer peripheral portion 68g of the second electrode 68, and the first resin frame film 76 is joined to the first electrode 66 and the second electrode 68. In this case, the first electrode 66, the first resin frame film 76, the electrolyte membrane 64, and the second electrode 68 stacked in the thickness direction are heated, and a load is applied to these components (hot pressing is performed) to join these components together. Thus, the frame member 62 is joined to the outer peripheral portion of the MEA 60, and the frame equipped MEA 10 is obtained.

The method of producing the frame equipped MEA 10, the frame equipped MEA 10, and the fuel cell 12 according to the embodiment of the present invention offer the following advantages.

The method of producing the frame equipped MEA 10 includes the first joining step of joining the first resin frame film 76 and the second resin frame film 78 together in the thickness direction to form the film joint body 100, the welding step of spot welding the resin sheet (the first resin sheet 80 and the second resin sheet 82) to the portion of the first resin frame film 76 facing the buffer (the second inlet buffer 44a and the second inlet buffer 44a) when the fuel cell 12 is formed, after the first joining step, to form the frame member 62, and the second joining step of joining the frame member 62 to the outer peripheral portion of the MEA 60.

In this method, the resin sheets (the first resin sheet 80 and the second resin sheet 82) are spot welded to the portion of the first resin frame film 76 facing the buffers (the second inlet buffer 44a and the second outlet buffer 44b) of the separator (second separator 16). In this manner, it is possible to increase the rigidity of the portion of the frame member 62 facing the buffers (the second inlet buffer 44a and the second outlet buffer 44b) of the separator (second separator 16). Further, in comparison with the case where the entire surfaces of the resin sheets (the first resin sheet 80 and the second resin sheet 82) are adhered to the first resin frame film 76 using an adhesive, it is possible to reduce the cost of the adhesive and the number of processes required for the joining step. Accordingly, it is possible to achieve reduction of the production cost.

In the method of producing the frame equipped MEA 10, in the welding step, the outer peripheral portions of the resin sheets (the first resin sheet 80 and the second resin sheet 82) are spot welded to the first resin frame film 76 at the plurality of positions. In this manner, the outer peripheral portions of the resin sheets (the first resin sheet 80 and the second resin sheet 82) can be joined to the first resin frame film 76 reliably.

In the method of producing the frame equipped MEA 10, the resin sheets (the first resin sheet 80 and the second resin sheet 82) are formed to have a polygonal shape. In the welding step, corners of the resin sheets (the first resin sheet 80 and the second resin sheet 82) are spot welded to the first resin frame film 76. In this manner, the corners of the resin sheets (the first resin sheet 80 and the second resin sheet 82) can be joined to the first resin frame film 76 reliably.

In the method of producing the frame equipped MEA 10, the resin sheets (the first resin sheet 80 and the second resin sheet 82) include the sheet bodies (the first sheet body 88a and the second sheet body 90a), and the extensions (the first extension 88b and the second extension 90b) extending from the sheet bodies (the first sheet body 88a and the second sheet body 90a) toward the outer end of the first resin frame film 76 opposite to the electrode (second electrode 68). In the welding step, portions adjacent to the extended ends of the extensions (the first extension 88b and the second extension 90b) are spot welded to the first resin frame film 76. In this manner, the extensions (the first extension 88b and the second extension 90b) can be joined to the first resin frame film 76 reliably.

In the method of producing the frame equipped MEA 10, the resin sheets (the first resin sheet 80 and the second resin sheet 82) are thicker than the first resin frame film 76 and the second resin frame film 78, respectively. In the structure, the rigidity in the portions of the frame member 62 facing the buffers (the second inlet buffer 44a and the second outlet buffer 44b) can be increased efficiently.

In the frame equipped MEA 10 and the fuel cell 12, the frame member 62 includes the first resin frame film 76 and the second resin frame film 78 joined together in the thickness direction, and the resin sheets (the first resin sheet 80 and the second resin sheet 82) having the spot-shape joint part in the portion of the first resin frame film 76 facing the buffers (the first buffer and the second buffer) when the fuel cell 12 is formed.

In the structure, the resin sheets (the first resin sheet 80 and the second resin sheet 82) having the spot-shape joint parts (the first joint part C1 and the second joint part C2) are provided in the portions of the first resin frame film 76 facing the buffers (the second inlet buffer 44a and the second outlet buffer 44b) of the separator (second separator 16). Therefore, it is possible to increase the rigidity in the portions of the frame member 62 facing the buffers (the second inlet buffer 44a and the second outlet buffer 44b) of the separator (second separator 16). Further, in comparison with the case where the entire surfaces of the resin sheets (first resin sheet 80 and the second resin sheet 82) are adhered to the first resin frame film 76 using the adhesive, it is possible to reduce the cost of the adhesive and the number of processes required for the joining steps. Accordingly, it is possible to achieve reduction of the production cost.

The first resin frame film 76 is held between the first electrode 66 and the second electrode 68. In the structure, it is possible to suppress deformation of the inner peripheral portion of the first resin frame film 76 due to the differential pressure between the anode and the cathode.

The surface size of the first electrode 66 is smaller than the surface size of the second electrode 68, and the inner peripheral portion 78n of the second resin frame film 78 is positioned outside the outer end of the first electrode 66 with the gap G1 between the inner peripheral portion 78n of the second resin frame film 78 and the outer end of the first electrode 66. In the structure, it is possible to reliably dispose the first electrode 66 inside the second resin frame film 78.

The gap G1 is overlapped with the second electrode 68 as viewed in the stacking direction of the electrolyte membrane 64, the first electrode 66, and the second electrode 68. In the structure, by the second electrode 68, it is possible to suppress deformation of the portion of the first resin frame film 76 exposed to the gap G1.

The present invention is not limited to the above described structure. In the present invention, any of the first resin sheet 80 and the second resin sheet 82 may be dispensed with as necessary. In the present invention, the number of the first fluid passages 26a and the number of second fluid passages 26b can be changed freely. That is, the first fluid passages 26a may comprise three fluid passages, i.e., the oxygen-containing gas supply passage 20a, the coolant discharge passage 22b1, and the fuel gas discharge passage 24b1. Further, the second fluid passage 26b may comprise three fluid passages, i.e., the fuel gas supply passage 24a, the coolant supply passage 22a1, and the oxygen-containing gas discharge passage 20b1.

The present invention is not limited to the above described embodiments. Various modifications may be made without departing from the gist of the present invention.

What is claimed is:

1. A method of producing a frame equipped membrane electrode assembly, the frame equipped membrane electrode assembly comprising:

a membrane electrode assembly including an electrolyte membrane and electrodes provided on both sides of the electrolyte membrane; and a frame member provided on an outer peripheral portion of the membrane electrode assembly;

the frame equipped membrane electrode assembly being sandwiched between a pair of separators to form a fuel cell, the pair of separators each including a buffer configured to connect a reactant gas flow field and a fluid passage together, the reactant gas flow field being configured to allow a reactant gas to flow along an electrode surface, the fluid passage being configured to allow the reactant gas to flow in a direction perpendicular to the electrode surface, the method comprising:

a first joining step of joining a first resin frame film and a second resin frame film together in a thickness direction to form a film joint body;

a welding step of spot welding a resin sheet to a portion of the first resin frame film facing the buffer when the fuel cell is formed, after the first joining step, to form the frame member including the first resin frame film, the second resin frame film, and the resin sheet; and a second joining step of joining the frame member to the outer peripheral portion of the membrane electrode assembly.

2. The method of producing the frame equipped membrane electrode assembly according to claim 1, wherein, in the welding step, an outer peripheral portion of the resin sheet is spot welded to the first resin frame film at a plurality of positions.

3. The method of producing the frame equipped membrane electrode assembly according to claim 1, wherein the resin sheet is formed to have a polygonal shape; and in the welding step, a corner of the resin sheet is spot welded to the first resin frame film.

4. The method of producing the frame equipped membrane electrode assembly according to claim 1, wherein the resin sheet includes a sheet body; and an extension extending from the sheet body toward an outer end of the first resin frame film opposite to the electrode, wherein, in the welding step, a portion adjacent to an extended end of the extension is spot welded to the first resin frame film.

5. The method of producing the frame equipped membrane electrode assembly according to claim 1, wherein thickness of the resin sheet is larger than thickness of the first resin frame film and thickness of the second resin frame film.

6. The method of producing the frame equipped membrane electrode assembly according to claim 1, wherein thickness of the first resin frame film is smaller than thickness of the second resin frame film.

7. A frame equipped membrane electrode assembly comprising:

a membrane electrode assembly including an electrolyte membrane and a first electrode provided on one surface of the electrolyte membrane and a second electrode provided on another surface of the electrolyte membrane; and a frame member provided on an outer peripheral portion of the membrane electrode assembly over an entire periphery;

the frame equipped membrane electrode assembly being sandwiched between a pair of separators to form a fuel cell, the pair of separators each including a buffer configured to connect a reactant gas flow field and a fluid passage together, the reactant gas flow field being configured to allow a reactant gas to flow along an electrode surface, the fluid passage being configured to allow the reactant gas to flow in a direction perpendicular to the electrode surface, wherein the frame member comprises:

a first resin frame film and a second resin frame film joined together in a thickness direction; and a resin sheet including a spot-shape joint part in a portion of the first resin frame film facing the buffer when the fuel cell is formed.

8. The frame equipped membrane electrode assembly according to claim 7, wherein the first resin frame film is held between the first electrode and the second electrode.

9. The frame equipped membrane electrode assembly according to claim 7, wherein surface size of the first electrode is smaller than surface size of the second electrode; and an inner end of the second resin frame film is positioned outside an outer end of the first electrode with a gap between the inner end of the second resin frame film and the outer end of the first electrode.

10. The frame equipped membrane electrode assembly according to claim 9, wherein the gap is overlapped with the second electrode as viewed in a stacking direction of the electrolyte membrane, the first electrode, and the second electrode.

11. A fuel cell comprising:

a pair of separators each including a buffer configured to connect a reactant gas flow field and a fluid passage together, the reactant gas flow field being configured to allow a reactant gas to flow along an electrode surface, the fluid passage being configured to allow the reactant gas to flow in a direction perpendicular to the electrode surface; and a frame equipped membrane electrode assembly being sandwiched between the pair of separators;

the frame equipped membrane electrode assembly comprising:

a membrane electrode assembly including an electrolyte membrane and a first electrode provided on one surface of the electrolyte membrane and a second electrode provided on another surface of the electrolyte membrane; and a frame member provided on an outer peripheral portion of the membrane electrode assembly over an entire periphery;

wherein the frame member comprises:

a first resin frame film and a second resin frame film joined together in a thickness direction; and a resin sheet including a spot-shape joint part in a portion of the second resin frame film facing the buffer when the fuel cell is formed.

* * * * *